Sept. 9, 1941.  F. M. GRIETEN  2,255,703
FISHING REEL
Filed Dec. 21, 1938  3 Sheets-Sheet 1
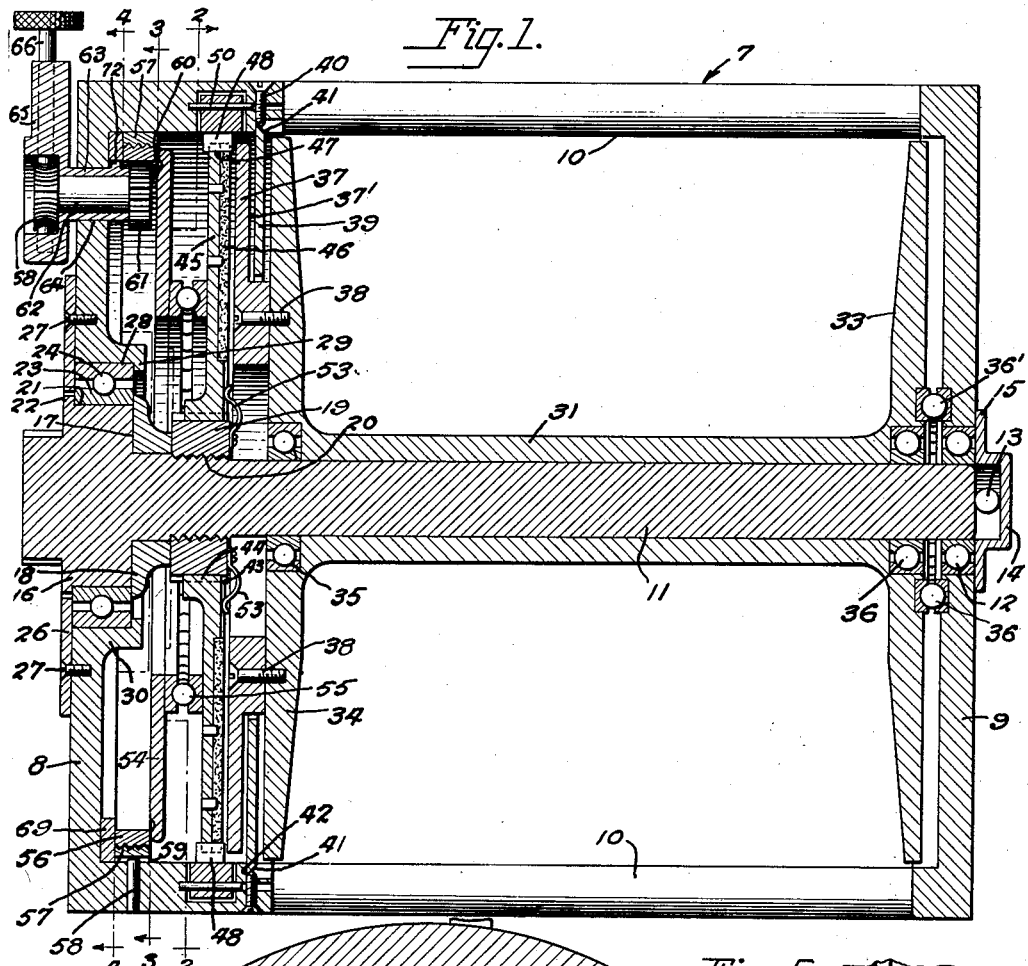
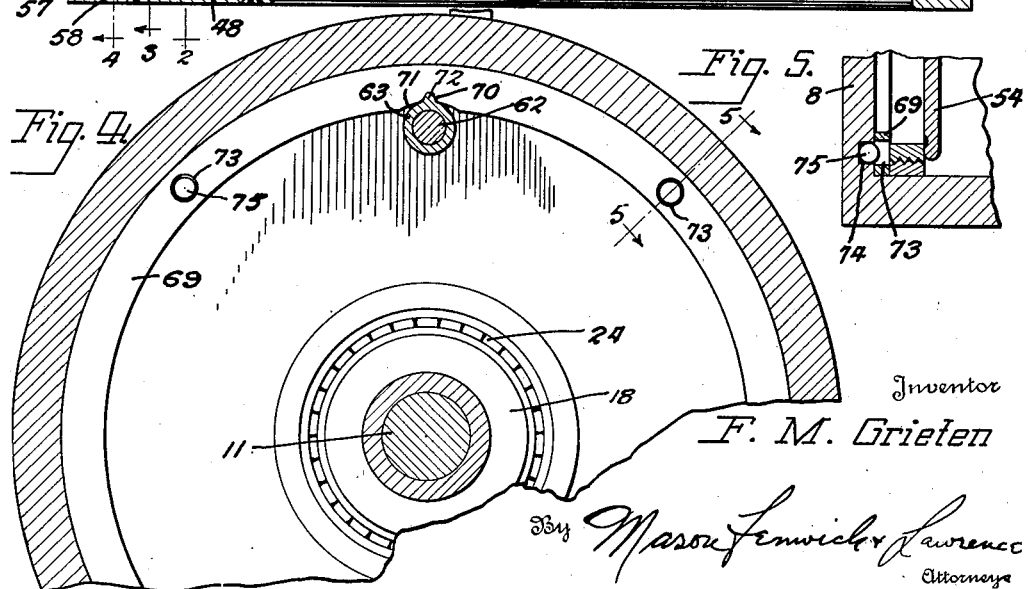
Inventor
F. M. Grieten
By Mason Fenwick & Lawrence
Attorneys Sept. 9, 1941.  F. M. GRIETEN  2,255,703
FISHING REEL
Filed Dec. 21, 1938   3 Sheets-Sheet 2

Inventor
F. M. Grieten
By Mason Fenwick & Lawrence
Attorneys

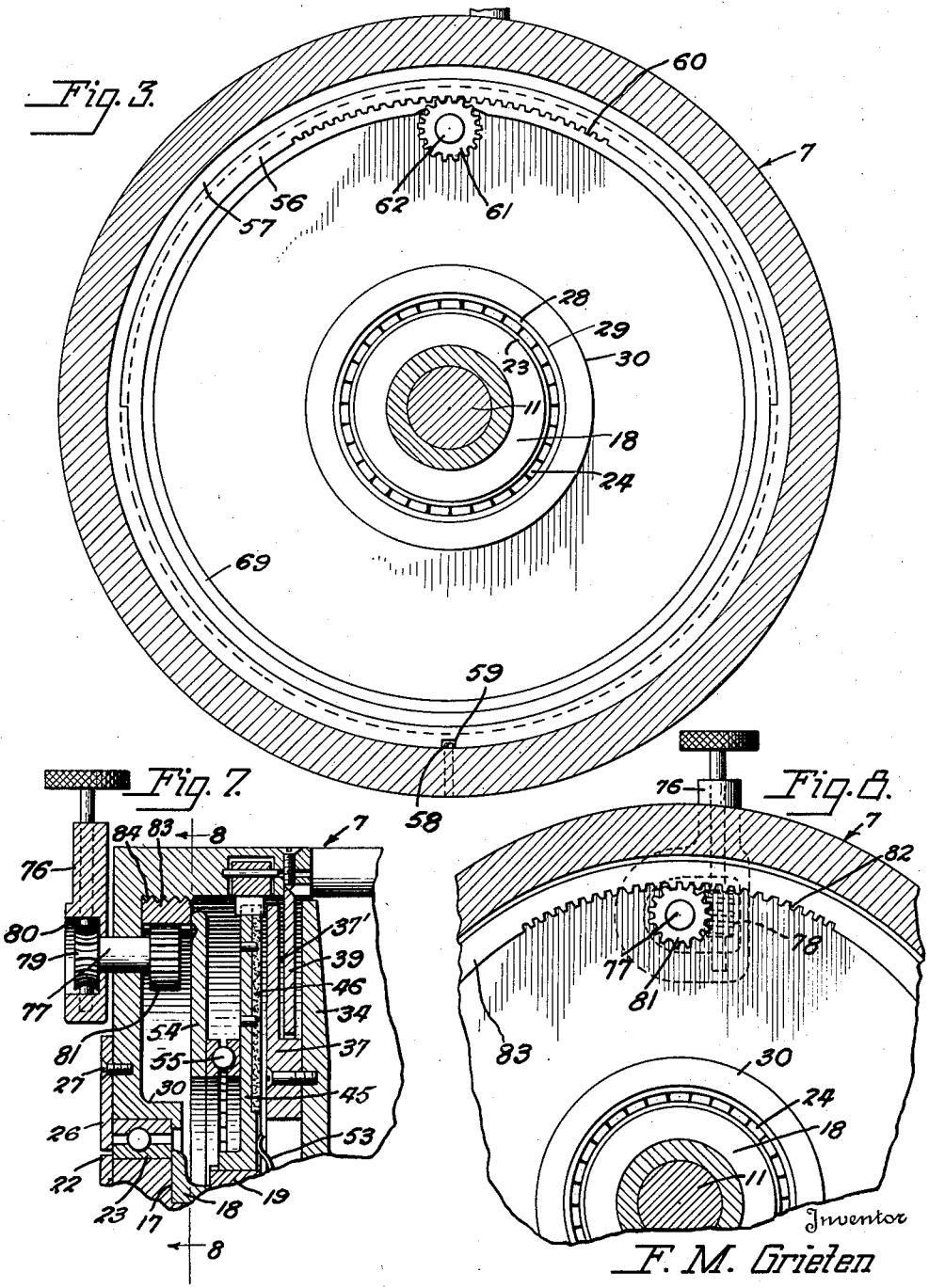

Patented Sept. 9, 1941

2,255,703

UNITED STATES PATENT OFFICE 2,255,703

FISHING REEL

Frederick M. Grieten, Miami, Fla.

Application December 21, 1938, Serial No. 247,121

9 Claims. (Cl. 242—84.5)

The invention forming the subject matter of this application relates to fishing reels in general; and more particularly to fishing reels designed to be mounted on a fixed support for use in the catching of large, salt water game fish.

The main object of the invention is to provide a fishing reel, of the character referred to, with brake mechanism adjustable to exert any desired braking effect upon the spool and adapted to be thrown into and out of braking action very rapidly.

A further object of the invention is to provide a reel of the character described with clutch mechanism adapted to be initially set by fine adjustment gearing which may be rotated bodily about the axis of the reel to effect the rapid braking action referred to.

Other objects of the invention will become apparent as the detailed description thereof proceeds.

In the drawings:

Figure 1 is a longitudinal section through a preferred form of this invention;

Figure 3 is a vertical section taken on the line 3—3 of Figure 1;

Figure 4 is a vertical section taken on the line 4—4 of Figure 1;

Figure 5 is a transverse section taken on the line 5—5 of Figure 4;

Figure 7 is a fragmentary longitudinal section through a modified form of the invention; and Figure 8 is a section taken on the line 8—8 of Figure 7.

Figure 2:
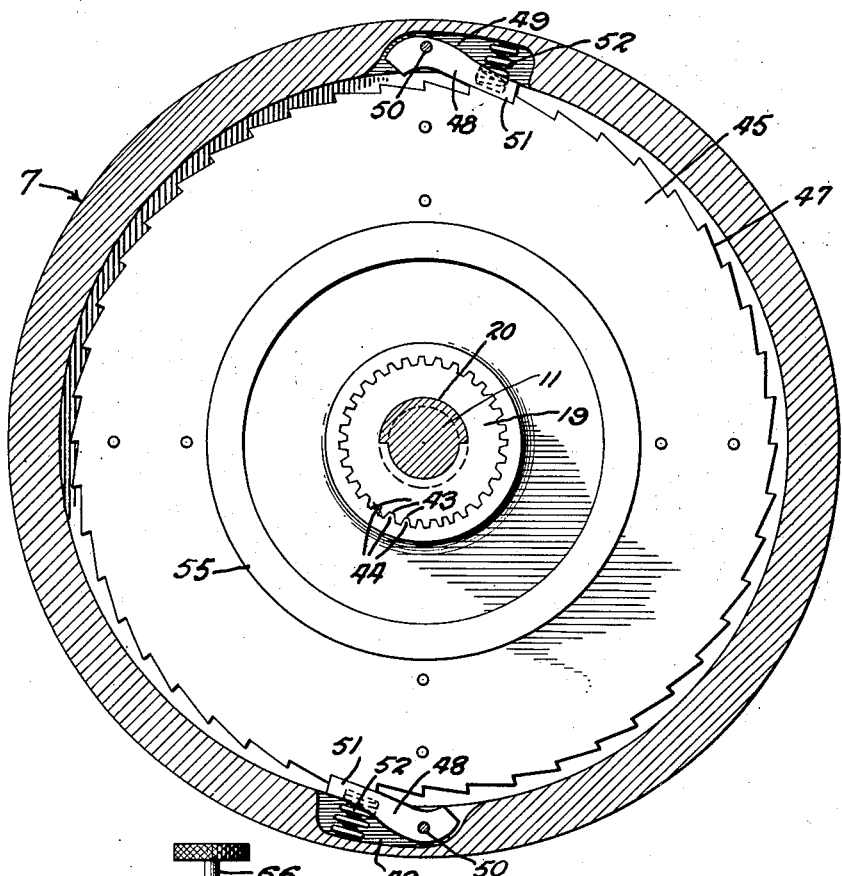
Figure 2 is a vertical transverse section taken on the line 2—2 of Figure 1.

The form of the invention illustrated in Figures 1 to 5 comprises a frame, designated generally by the reference numeral 7, and including end walls 8 and 9 connected to each other by cross bars 10 such as are commonly used for this purpose. The shaft 11 of the reel is rotatably mounted in the end wall 9 by the ball bearing 12, and is prevented from axial movement outwardly through the end wall 9 by the thrust ball 13 mounted on a cap 14 having a flange 15 suitably secured to the outer surface of the end wall 9 to retain the ball bearing 12 and the ball 13 in assembled relation.

The other end of the shaft 11 is enlarged to form an annular flange 16 provided with a shoulder 17 forming a seat for a collar 18 locked against said shoulder 17 by a nut 19 screw-threaded onto a correspondingly threaded part 20 of the shaft 11. The enlarged annular flange 16 is provided with a peripheral rabbet 21 forming a flange 22. A ball bearing race 23 is seated in said annular rabbet 21 and is clamped against the shoulder formed by the flange 22 by the collar 18 and the ring nut 19.

A washer plate 26 of substantially the same thickness as the flange 22 is secured to the end wall 8 by screws 27 in such manner as to extend across both inner and outer races of the ball bearing 24 and to hold the outer race 28 clamped against an annular flange 29 formed on a boss 30 projecting inwardly from the end wall 8.

A line spool 31 having line-confining flanges 33 and 34 extending from its opposite ends is mounted to rotate on the shaft 11 by means of the ball bearings 35 and 36, a thrust ball bearing 36′ being interposed between the outer surface of the flange 33 and the inner surface of the end wall 9 of the reel housing 7. The flanges 33 and 34 extend from opposite ends of the spool 31 to limit the movements of the line in either direction axially on the said spool.

A friction plate 37, forming one of the elements of the clutch mechanism for applying a braking effect to the spool 31, is secured to the outer face of the flange 34 by means of the screws 38. The plate 37 is rabbeted to form a recess 37′ to receive an annular plate 39 secured in position in the housing 7 by the screws 40 extending radially through the housing 7 to contact with the inclined edge 41 of the plate 39 and clamp the same against a shoulder 42 formed in said housing. The plate 39 is a closure intended to prevent oil and dirt passing onto the line from the gearing and clutch mechanism mounted between the end wall 8 of the housing and the flange 34 of the spool.

The clamping ring nut 19 is provided on its periphery with axially extending slots 43 adapted to receive slidably the radial splines 44 formed on the clutch plate or friction disc 45, provided with an annular sheet 46 of friction material adapted to engage the adjacent face of the other clutch plate 37. The clutch plate 45 is provided on its periphery with ratchet teeth 47 adapted to be engaged by one end of a pawl 48 to limit the rotation of the clutch plate 45 in one direction. As shown in Figure 2, the pawl 48 is mounted in a recess 49 to pivot about a pivot pin 50 with its inner end 51 held in yielding contact against the teeth 47 by means of a compression spring 52 interposed in said recess 49 between the bottom of the recess and the end 51 of the pawl.

The clutch plate 45 is pressed outwardly from the plate 37 by means of leaf springs 53 secured at one end to the inner end of the ring nut 19 and having their outer free ends pressing against the inner face of the clutch plate 45. Movement of the clutch plate 45 toward the plate 37 and against the yielding pressure of the springs 53 is effected by an annular thrust plate 54, separated from the plate 45 by means of the ball bearing 55. The term friction disc herein refers to the elements 45, 46, 54, and 55 save wherein they are each specifically set forth in terms, and then it only refers to the element 45 itself. The outer edge of the annular plate 54 bears against an externally screw-threaded inner ring 56 which meshes with an internally screw-threaded outer ring 57, the latter being slidably and non-rotatably mounted in the housing 7 by engagement of the radially extending pins 58 with registering slots 59 formed in the periphery of the aforesaid outer ring 57.

Figure 6:
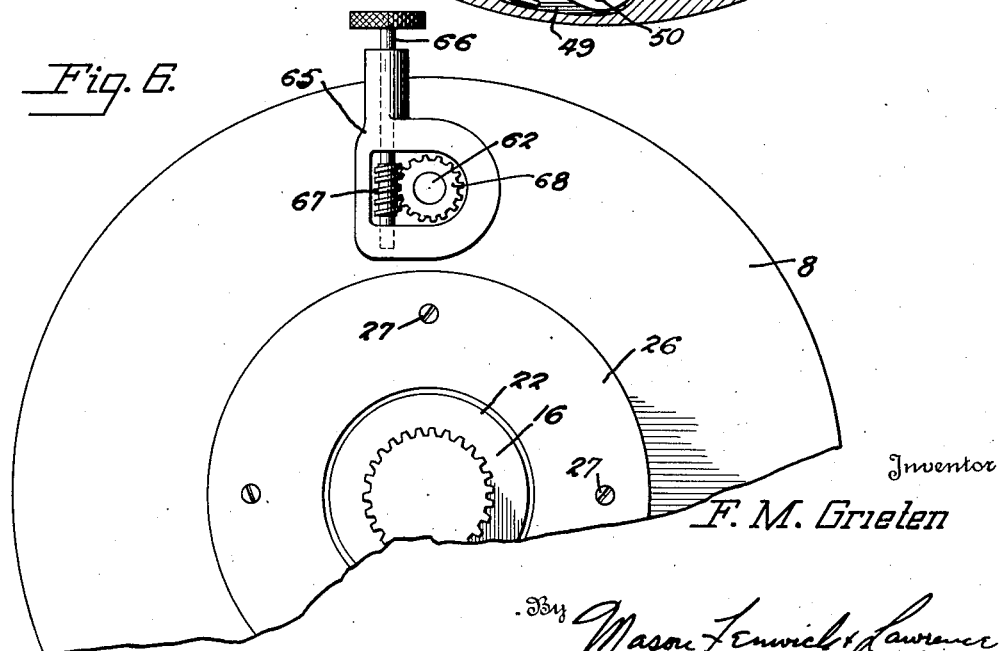
Figure 6 is a fragmentary end elevation of the reel shown in Figures 1 to 5.

The inner periphery of the inner ring 56 is provided with gear teeth 60 in mesh with the corresponding teeth of a pinion 61 suitably secured to the inner end of a small shaft 62 mounted to rotate in a sleeve 63 journalled to rotate as a shaft in a bearing aperture 64 formed in the end plate 8. The sleeve 63 is formed integral with a housing 65 (see Figure 6) extending in a direction generally parallel to the end wall 8 of the housing 7. A shaft 66 is mounted to rotate in the housing 65 and has a worm 67 suitably secured thereto to mesh with a worm gear 68 secured to the outer end of the shaft 62.

To effect rapid engagement between the clutch plate 37 and lining 46, an annular plate 69 is interposed in the housing 7 between the inner surface of the end wall 8 and the outer edges of the screw-threaded rings 56 and 57. The annular plate 69 is provided on its inner periphery with a notch 70 (see Figure 4) extending inwardly from an arcuate recess 71 and adapted to receive a lug 72 projecting radially outward from the sleeve 63. The plate 69 is provided with apertures 73 normally in register with recesses 74 (see Figure 5) in each of which is seated a ball 75. The apertures 73 are slightly less in diameter than the diameters of the balls 75 and the recesses 74 are preferably about $\frac{1}{32}$ inch less in depth than the diameters of said balls so that when the plate 69 is rotated, by engagement of the lug 72 with the notch 70, the balls 75 will ride over the outer face of the plate 69 to force the clutch plate 45 substantially instantaneously toward the clutch plate 37.

It will be apparent from the disclosure so far that fine adjustment of the clutch plate 45 against the yielding pressure of the spring 53 may be secured by rotation of the shaft 66 in its housing 65. It will also be apparent that the rapid adjustment due to rotation of the plate 69 is effected by rotation of the housing 65 bodily around the axis of the smaller shaft 62.

If the plate 69 be made about $\frac{1}{32}$ of an inch less in thickness than the diameter of the balls 75, it is obvious that the aperture 73 in the plate may be made of the same diameters as the balls 75 and the recesses in which the balls are located. It is essential in any case that when the plate 69 is rotated about the axis of the shaft 11, the balls 75 project in such manner as to force the plate inwardly of the reel through the desired distance.

In the form of the invention illustrated in Figures 7 and 8, the plate 69 and the outer ring 57 are omitted. The clutch plate elements are substantially the same as those described in the preferred form of the invention, and are similarly numbered in Figures 7 and 8. In this form a housing 76 is rotatably mounted on the outer end of the adjusting shaft 77 and is provided with a worm 78 meshing with a worm gear 79 suitably secured to the outer end of the shaft 77 and against a shoulder formed by a recess 80 in the said housing 76.

The inner end of the shaft 77 has a pinion 81 suitably secured thereto and in mesh with the gear teeth 82 formed on a ring 83 which has its outer edge screw-threaded and engaging the internal screw-threads 84 formed on the cylindrical wall of the housing 7 adjacent the inner surface of the end wall 8 of the aforesaid housing. It will be evident that a slow and fine adjustment of the clutch plate 45 may be secured by rotation of the shaft 77 in its housing 76; and that a more rapid adjustment of the ring 83 in the screw-threads 84 may be secured by rotating the housing 76 bodily about the axis of the shaft 77. The main difference between the two forms of the invention is that the adjustment of the clutch plate in the form shown in Figure 1 is practically instantaneous; while that shown in Figures 7 and 8 must, of necessity, be considerably slower because the adjustment is effected through the screw-threaded engagement between the ring 83 and the internal screw-threads on the housing 7.

The mechanism employed for imparting rotation to the shaft 11 is not illustrated herein since it does not form any part of the present invention. It is to be understood, however, that the invention is not to be considered as limited to the particular details of construction shown and described herein, nor in any other manner except as indicated by the scope of the claims appended hereto.

What I claim is:

1. In a fishing reel, a substantially cylindrical housing, a shaft journalled in said housing, a spool mounted to rotate freely on said shaft and having line confining flanges extending from its opposite ends, an annular clutch plate secured to the outer face of one of said flanges, a friction disk mounted to slide axially on said shaft toward and from said plate, cooperating means on said housing and disk to prevent rotation thereof in one direction, a leaf spring secured at one end to said shaft and having its other end in contact with said disk to hold the disk normally separated from said plate, a ring engaging the outer face of said disk near the periphery thereof and operable by rotation in said housing to move said disk against the pressure of said spring, cooperating means on said housing and ring for mounting the ring to slide and rotate in said housing, and means for rotating said ring.

2. In a fishing reel, a substantially cylindrical housing, a shaft journalled in said housing, a spool mounted to rotate freely on said shaft and having line confining flanges extending from its opposite ends, an annular clutch plate secured to the outer face of one of said flanges, a friction disk mounted to slide axially on said shaft toward and from said plate, cooperating means on said housing and disk to prevent rotation thereof in one direction, a leaf spring secured at one end to said shaft and having its other end in contact with said disk to hold the disk normally separated from said plate, a ring engaging the outer face of said disk near the periphery thereof and operable by rotation in said housing to move said disk against the pressure of said spring, cooperating means on said housing and ring for mounting the ring to slide and rotate in said housing, said ring having gear teeth on its inner periphery, a second shaft mounted to rotate in said housing, a pinion fixed to one end of said second shaft to mesh with said gear teeth and means for rotating said second shaft.

3. The reel set forth in claim 2 and in which the last named means comprises a housing mounted on said second shaft to rotate about the axis thereof, a worm gear fixed to the other end of said second shaft, a third shaft rotatable in said housing and a worm fixed to said third shaft and in mesh with said worm gear.

4. The reel set forth in claim 2 in which the last named means comprises an arm extending at right angles to said second shaft to impart rotation thereto.

5. In a fishing reel, a substantially cylindrical housing, a shaft journalled in said housing, a spool mounted to rotate freely on said shaft and having line confining flanges extending from its opposite ends, an annular clutch plate secured to the outer face of one of said flanges, a friction disk mounted to slide axially on said shaft toward and from said plate, cooperating means on said housing and friction disk to prevent rotation thereof in one direction, a leaf spring secured at one end to said shaft and having its other end in contact with said friction disk to hold the disk normally separated from said plate, a thrust plate adapted to transmit axial movement to the friction disk, an inner ring engaging the outer face of said thrust plate near the periphery thereof and having its outer periphery screw-threaded, a second ring slidably mounted in said housing with its inner periphery internally screw-threaded to receive the screw-threads on the first named ring and means for rotating said inner ring.

6. The combination with the device set forth in claim 5 of an end wall, an annular plate seated against the inner surface of said end wall and in contact with said internally threaded ring, means operable by the rotation of said plate to move said plate axially from said end wall, and means rotatable on said housing and engagable with said annular plate to rotate said plate and slide both rings axially within said housing.

7. The combination with the device set forth in claim 5 of an end wall, an annular plate seated against the inner surface of said end wall and constantly in contact with said internally threaded ring, means operable by the rotation of said plate to move said plate axially from said end wall, and means on said housing for simultaneously rotating said inner ring in the internally threaded ring and said annular plate about its axis to effect a simultaneous sliding of both rings.

8. A fishing reel comprising a housing, a shaft journalled therein, a spool rotatable on said shaft and having line confining flanges extending from opposite ends thereof, a friction disk secured to one of said flanges, a friction plate slidable axially on said shaft, cam means mounted for rotation adjacent the end wall of said housing, means coacting with said cam means for moving said cam means axially upon rotation thereof, means cooperating with said cam means to transmit axial movement to the friction plate and means for rotating said cam means to move said plate rapidly into braking contact with said disk.

9. The device set forth in claim 8 in which said cam cooperating means includes fine adjustment mechanism for moving the friction plate toward and from said disk.

FREDERICK M. GRIETEN.